United States Patent
Daly

(10) Patent No.: US 10,648,486 B2
(45) Date of Patent: May 12, 2020

(54) FAN WITH IMPELLER BASED ON AN AUDIO SPREAD-SPECTRUM

(71) Applicant: Microsoft Technology Licensing, LLC, Redmond, WA (US)

(72) Inventor: Gregory M. Daly, Seattle, WA (US)

(73) Assignee: MICROSOFT TECHNOLOGY LICENSING, LLC, Remond, WA (US)

( * ) Notice: Subject to any disclaimer, the term of this patent is extended or adjusted under 35 U.S.C. 154(b) by 284 days.

(21) Appl. No.: 15/589,066

(22) Filed: May 8, 2017

(65) Prior Publication Data
US 2018/0320709 A1 Nov. 8, 2018

(51) Int. Cl.
| | |
|---|---|
| G06F 11/30 | (2006.01) |
| F04D 29/66 | (2006.01) |
| F04D 25/08 | (2006.01) |
| F04D 29/32 | (2006.01) |
| G05B 15/02 | (2006.01) |
| F04D 29/28 | (2006.01) |

(52) U.S. Cl.
CPC ......... *F04D 29/666* (2013.01); *F04D 25/08* (2013.01); *F04D 29/281* (2013.01); *F04D 29/328* (2013.01); *F04D 29/662* (2013.01); *F04D 29/663* (2013.01); *G05B 15/02* (2013.01)

(58) Field of Classification Search
CPC .................................................. F04D 29/666
See application file for complete search history.

(56) References Cited

U.S. PATENT DOCUMENTS

| | | | | |
|---|---|---|---|---|
| 4,253,800 | A | * | 3/1981 | Segawa ..................... F01D 5/10 415/119 |
| 5,288,216 | A | | 2/1994 | Bolte |
| 5,478,201 | A | | 12/1995 | Amr |
| 5,478,291 | A | | 12/1995 | Morisawa et al. |
| 5,588,618 | A | | 12/1996 | Marze et al. |
| 5,681,145 | A | | 10/1997 | Neely et al. |
| 5,993,161 | A | | 11/1999 | Shapiro |

(Continued)

FOREIGN PATENT DOCUMENTS

| CN | 2697716 Y | 5/2005 |
|---|---|---|
| CN | 104074797 A | 10/2014 |

(Continued)

OTHER PUBLICATIONS

"International Search Report and Written Opinion Issued in PCT Application No. PCT/US2018/028710", dated Jul. 26, 2018, 11 Pages.

(Continued)

*Primary Examiner* — Phuong Huynh
(74) *Attorney, Agent, or Firm* — Arent Fox LLP

(57) ABSTRACT

A fan for cooling an electronic device is described, wherein the fan can include an enclosure and a motor secured within the enclosure. The fan can also include an impeller to be turned by the motor, the impeller having a plurality of blades, wherein an angular spacing of the blades results in an audio spread-spectrum within a range of audio frequencies. In some examples, an arrangement of the blades has a center of mass below a threshold, and the angular spacing of the blades and a blade pass frequency (BPF) results in sound that is distributed in the range of audio frequencies.

20 Claims, 6 Drawing Sheets

(56) References Cited

U.S. PATENT DOCUMENTS

| | | | |
|---|---|---|---|
| 6,139,275 | A | 10/2000 | Noda et al. |
| 7,300,244 | B2 | 11/2007 | Baugh et al. |
| 8,167,540 | B2 | 5/2012 | Schlinker et al. |
| 8,398,380 | B2 | 3/2013 | Duke |
| 2002/0095242 | A1 | 7/2002 | Bechhoefer |
| 2002/0159881 | A1 | 10/2002 | Marshall et al. |
| 2008/0180911 | A1 | 7/2008 | Kaneko et al. |
| 2009/0014581 | A1 | 1/2009 | Kebrle et al. |
| 2012/0321493 | A1 | 12/2012 | Duke et al. |
| 2012/0321494 | A1 | 12/2012 | Duke et al. |
| 2012/0321495 | A1* | 12/2012 | Duke .................. F04D 29/281 417/423.7 |
| 2014/0127022 | A1 | 5/2014 | Cheng et al. |

FOREIGN PATENT DOCUMENTS

| | | |
|---|---|---|
| KR | 20130081387 A | 7/2013 |
| TW | 201122238 A | 7/2011 |

OTHER PUBLICATIONS

Ewalda, Donald et al., "Noise Reduction by Applying Modulation Principles", In the Journal of the Acoustical Society of America, vol. 49, Issue 5A, May 1971, pp. 1381-1385, The University of Wisconsin, Madison, Wisconsin, US, English.

* cited by examiner

602 — DRIVE A FAN WITH A MOTOR, THE FAN HAVING AN IMPELLER WITH A PLURALITY OF BLADES, THE BLADES BEING ANGULARLY SPACED AROUND A HUB TO PROVIDE AN AUDIO SPREAD-SPECTRUM WITHIN A RANGE OF AUDIO FREQUENCIES, AND WHEREIN AN ARRANGEMENT OF THE BLADES HAS A CENTER OF MASS BELOW A THRESHOLD, AND WHEREIN THE ANGULAR SPACING OF THE BLADES AND A BLADE PASS FREQUENCY (BPF) RESULTS IN SOUND THAT IS DISTRIBUTED IN THE RANGE OF AUDIO FREQUENCIES

FAN WITH IMPELLER BASED ON AN AUDIO SPREAD-SPECTRUM

BACKGROUND

As electronic devices include faster processors, additional memory, and additional components, the electronic devices generate an increasing amount of heat. Accordingly, the electronic devices incorporate larger fans or additional fans, along with impellers that can blow the air to reduce an operating temperature of the electronic device. In some examples, the larger fans or additional fans and impellers of an electronic device can result in more sound. Furthermore, in some embodiments, the sound generated by the fans and impellers of electronic devices can resonate in frequencies that are undesirable.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment, a fan for cooling an electronic device can include an enclosure, a motor secured within the enclosure, and an impeller to be turned by the motor. In some examples, the impeller has a plurality of blades, wherein an angular spacing of the blades is identified using a plurality of algorithms and a mechanical tolerance of the blades that results in an audio spread-spectrum within a range of audio frequencies. In some examples, an arrangement of the blades has a center of mass below a threshold, and the angular spacing of the blades and a blade pass frequency (BPF) results in sound that is distributed in the range of audio frequencies.

Another embodiment described herein includes a method of operating a fan that includes driving a fan with a motor, the fan having an impeller with a plurality of blades. In some examples, the blades are angularly spaced around a hub to provide an audio spread-spectrum within a range of audio frequencies, wherein an arrangement of the blades has a center of mass below a threshold, and wherein the angular spacing of the blades and a blade pass frequency (BPF) results in sound that is distributed in the range of audio frequencies.

In another embodiment described herein, a method for designing impellers can include detecting a number of blades to be included in an impeller design and a mechanical tolerance of the blades. The method can also include detecting a plurality of algorithms corresponding to the impeller design, wherein the plurality of algorithms identify an angular spacing of the blades that results in an audio spread-spectrum within a range of audio frequencies. Additionally, the method can include generating the impeller design based on the plurality of algorithms, wherein the impeller design comprises an arrangement of the plurality of blades with a center of mass below a threshold, and wherein the angular spacing of the blades and a blade pass frequency (BPF) results in sound that is distributed in the range of audio frequencies. Furthermore, the method can include transmitting instructions to a fabrication device to manufacture an impeller based on the impeller design.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 6 is a process flow diagram of an example method for operating a fan based on an audio spread-spectrum.

DETAILED DESCRIPTION

Figure 1:
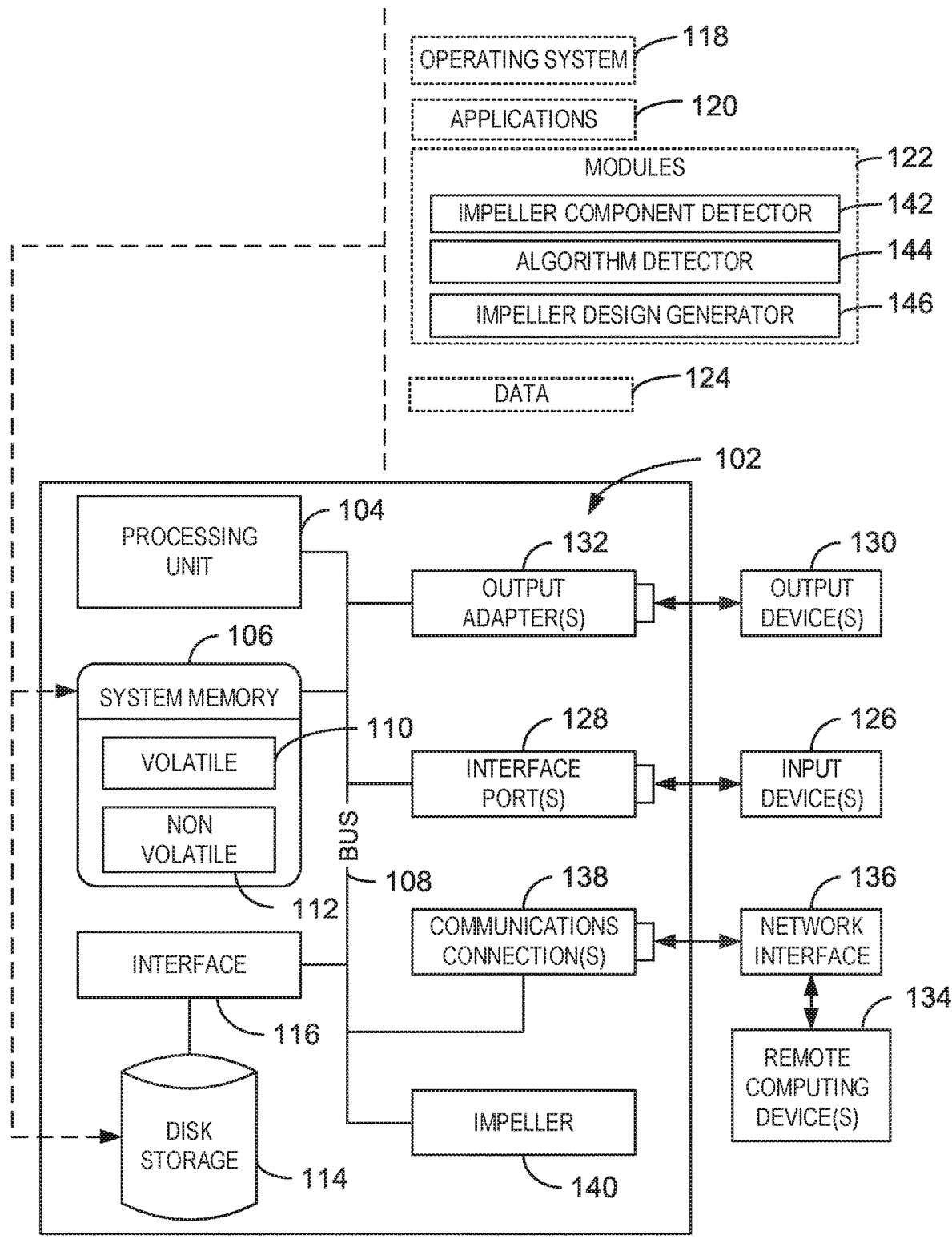
FIG. 1 is a block diagram of an example of a computing system that can generate an impeller design based on an audio spread-spectrum.

Techniques described herein provide a fan that can include an impeller based on an audio spread-spectrum. An audio spread-spectrum, as referred to herein, can include any suitable number of audio frequencies in which a sound is to be evenly distributed. In some embodiments, a fan for cooling an electronic device can include an enclosure and a motor secured within the enclosure. The fan can also include an impeller that can be turned by the motor. In some examples, the impeller can have a plurality of blades. The blades, as referred to herein, can include any suitable segment of material that is designed to rotate around a center hub of an impeller to move air. An angular spacing of the blades can result in an audio spread-spectrum within a range of audio frequencies and an arrangement of the blades can have a center of mass below a threshold. In some examples, the angular spacing of the blades and a blade pass frequency (BPF) results in sound that is distributed in the range of audio frequencies.

In some embodiments, a device can include a processor that can detect a number of blades to be included in an impeller design and a mechanical tolerance of the blades. The mechanical tolerance, as referred to herein, can indicate an ability to mold an impeller assembly and have the impeller assembly release from the mold properly. In some examples, the mechanical tolerance can also indicate an angle at which above or below the angle, the ability to efficiently move air from a specific blade is reduced. In some examples, the processor can also detect a plurality of algorithms corresponding to the impeller design, wherein the plurality of algorithms identify an angular spacing of the blades that results in an audio spread-spectrum within a range of audio frequencies. For example, the blades of the impeller can be spaced around a center hub of the impeller so that angles between the blades result in the impeller generating a sound that is spread evenly within a range of audio frequencies. Furthermore, the processor can generate the impeller design based on the plurality of algorithms, wherein the impeller design comprises an arrangement of the plurality of blades with a center of mass below a threshold. For example, the impeller design can have a center of mass approaching zero, which indicates that the center of mass is located in the center of the hub of the impeller. The generated impeller design can also include angular spacing of the blades wherein a blade pass frequency (BPF) results in sound that is distributed in the range of audio frequencies. Accordingly, the impeller design reduces the wobble of the blades as the blades rotate around the hub during operation of the impeller while producing sound that is evenly distributed within a range of audio frequencies.

Accordingly, the techniques described herein can reduce sound from an impeller within certain frequencies and instead identify an impeller that generates sound that is evenly distributed across a range of audio frequencies. Therefore, the impeller herein may not generate sound above a threshold level for certain undesirable audio frequencies. Thus, the impeller has a reduced mechanical stress while preventing sound from resonating in specific undesirable frequencies.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality.

The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate an impeller design based on an audio spread-spectrum. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102. In some embodiments, the remote computing devices 134 can include any suitable fabrication device that can manufacture a three dimensional object such as an impeller based on the impeller design described herein.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include an impeller 140. For example, the impeller 140 can include any suitable number of blades. In some embodiments, the blades can be spaced around a center hub of the impeller 140 at any suitable angle. Thus, arranging the blades at various angles around the center hub can spread the sound generated by the impeller 140 evenly within a range of audio frequencies. Additionally, the blades can be arranged so that the center of mass of the impeller 140 is within a threshold distance of the center of the center hub. In some examples, an angular spacing of the blades is identified using a plurality of algorithms and a mechanical tolerance of the blades that results in an audio spread-spectrum within a range of audio frequencies. In some examples, an arrangement of the blades has a center of mass below a threshold, and the angular spacing of the blades and a blade pass frequency (BPF) results in sound that is distributed in the range of audio frequencies.

The computer 102 includes one or more modules 122, such as an impeller component detector 142, an algorithm detector 144, and an impeller design generator 146. In some embodiments, the impeller component detector 142 can detect a number of blades to be included in an impeller design and a mechanical tolerance of the blades. In some examples, the algorithm detector 144 can detect a plurality of algorithms corresponding to the impeller design, wherein the plurality of algorithms identify an angular spacing of the blades that results in an audio spread-spectrum within a range of audio frequencies. In some embodiments, the impeller component detector 146 can generate the impeller design based on the plurality of algorithms, wherein the impeller design comprises an arrangement of the plurality of blades with a center of mass below a threshold, and wherein the angular spacing of the blades and a blade pass frequency (BPF) result in a sound that is distributed in the range of audio frequencies. Generating the impeller design is described in greater detail below in relation to FIGS. 3 and 4. In some examples, a tonal component of the impeller described herein is reduced as the revolutions per minute of the impeller increase. In some examples, the sound power of the impeller is lower with less high-frequency energy. In some examples, a sharpness of noise generated by the impeller decreases as revolutions per minute decrease.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the impeller component detector 142, algorithm detector 144, and impeller design generator 146 may be partially, or entirely, implemented in hardware and/or in the processor 104. For example, the functionality may be implemented with an application specific integrated circuit, in logic implemented in the processor 104, or in any other device.

Figure 2:
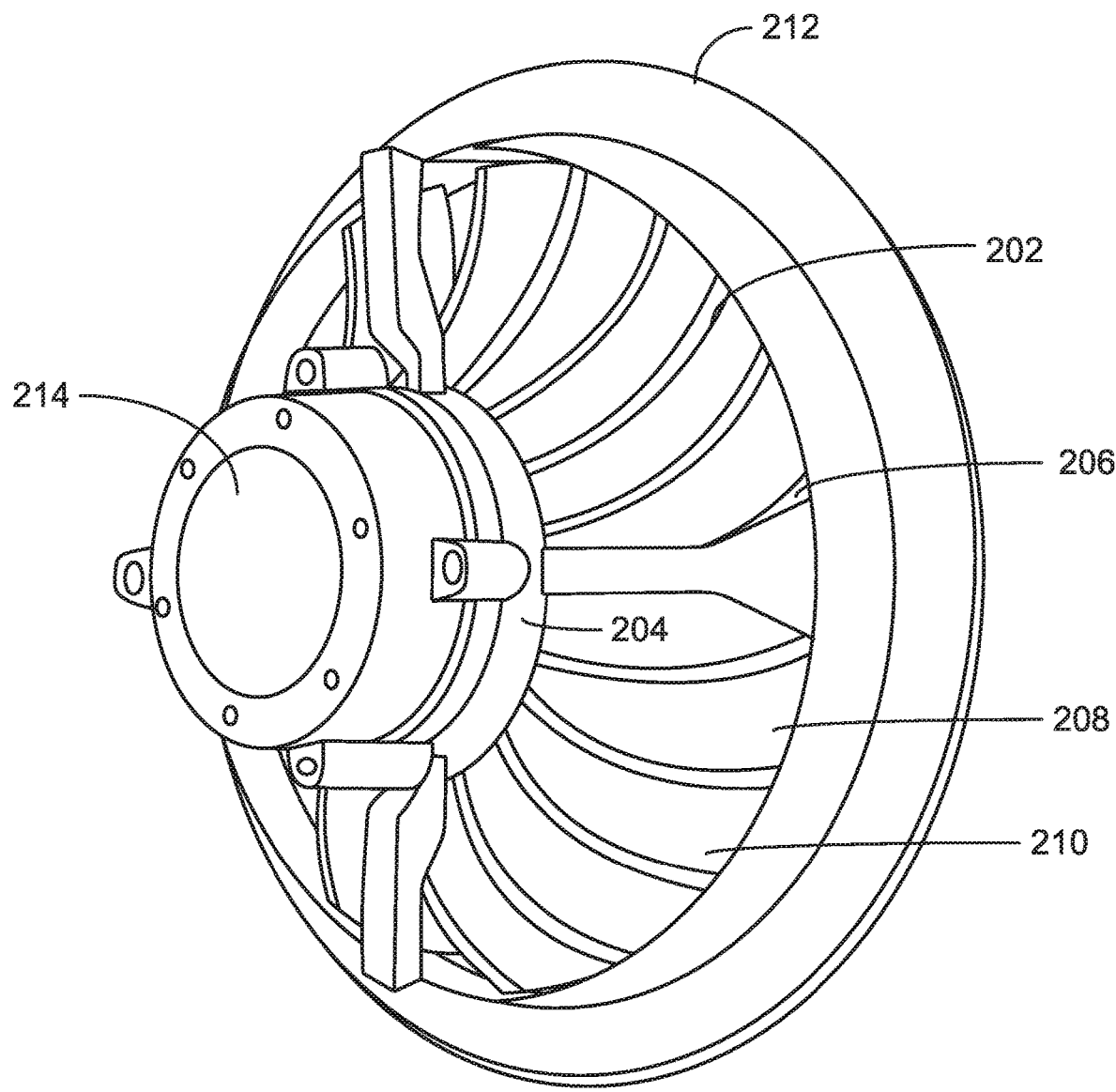
FIG. 2 is a diagram illustrating an impeller based on an audio spread-spectrum.

FIG. 2 is a diagram illustrating an impeller based on an audio spread-spectrum. The impeller 200 can include any suitable number of blades 202. In some embodiments, the blades 202 can be spaced around a center hub 204 of the impeller 200 at any suitable angle. Accordingly, angle 206 may differ from angles 208 and 210. Thus, arranging the blades 200 at various angles around the center hub 204 can spread the sound generated by the impeller 200 evenly within a range of audio frequencies. Additionally, the blades 200 can be arranged so that the center of mass of the impeller is within a threshold distance of the center of the center hub 204. Arranging the blades 200 using the techniques herein can reduce the mechanical tension or stress generated within the impeller 200 when in motion while spreading the sound generated by the impeller evenly with a range of audio frequencies.

In some embodiments, the impeller 200 can be included in an enclosure 212 and the impeller 200 can be turned by a motor 214 secured within the enclosure 212. In some examples, the impeller 200 can have a plurality of blades 202, wherein an angular spacing of the blades 202 is identified using a plurality of algorithms and a mechanical tolerance of the blades 202 that results in an audio spread-spectrum within a range of audio frequencies. In some examples, an arrangement of the blades 202 has a center of mass below a threshold, and the angular spacing of the blades 202 and a blade pass frequency (BPF) results in sound that is distributed in the range of audio frequencies.

It is to be understood that the block diagram of FIG. 2 is not intended to indicate that the impeller 200 is to include all of the components shown in FIG. 2. Rather, impeller 200 can include fewer or additional components not illustrated in FIG. 2. For example, the impeller 200 may include any suitable number of blades. Additionally, the impeller 200 may include any suitable outer perimeter surface 212.

Figure 3:
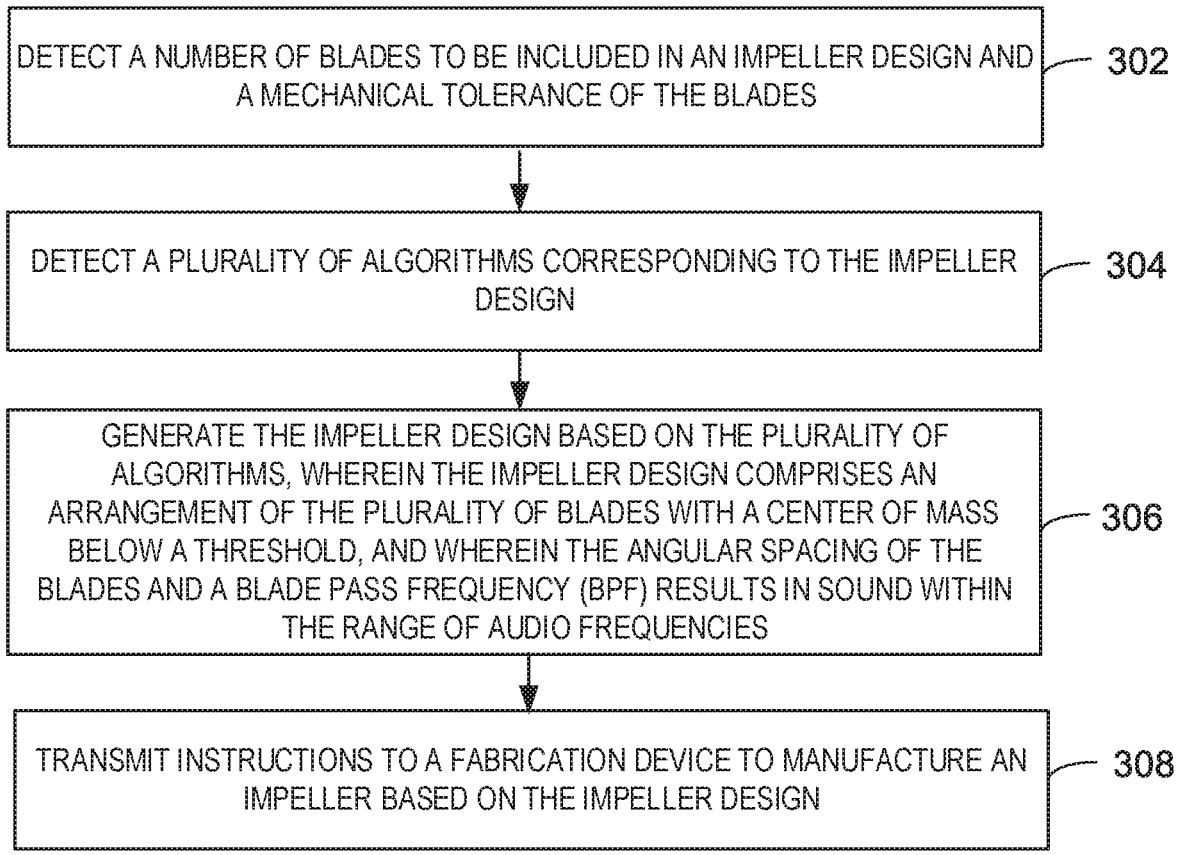
FIG. 3 is a process flow diagram of an example method for generating an impeller design based on an audio spread-spectrum.

FIG. 3 is a process flow diagram of an example method for generating an impeller design based on an audio spread-spectrum. The method 300 can be implemented with any suitable computing device, such as the computing system 102 of FIG. 1.

At block 302, an impeller component detector 142 can detect a number of blades to be included in an impeller design and a mechanical tolerance of the blades. For example, the impeller component detector 142 can detect a number of blades to be included in an impeller based on any suitable odd number, even number, or prime number, among others. In some embodiments, the impeller component detector 142 can detect the number of blades and the mechanical tolerance of the blades from user input, a separate application, or a machine learning module, among others. As discussed above, an impeller can rotate the blades around a center hub to move air within an electronic case. In some embodiments, the impeller can remove hot air from an electronic case to lower the temperature within the electronic case. The impeller component detector 142 can also detect a mechanical tolerance value that indicates a range of angles that blades can be placed around the center hub of the impeller without compromising structural integrity of the blades or the impeller itself. The angles referred to herein correspond to angles between two adjacent blades at points where the blades connect to the center hub of the impeller. For example, blades may be arranged to attach to the center hub of the impeller at points that are not evenly spaced around the center hub. In some examples, the mechanical tolerance can be five percent or any other suitable value.

At block 304, an algorithm detector 144 can detect a plurality of algorithms corresponding to the impeller design, wherein the plurality of algorithms identify an angular spacing of the blades that results in an audio spread-spectrum within a range of audio frequencies. The audio spread-spectrum referred to herein can include distributing sound produced by an impeller within any suitable range of audio frequencies. In some embodiments, the audio spread-spectrum can include evenly distributing sound generated by an impeller within a range of audio frequencies. In some examples, the audio spread-spectrum can include distributing sound generated by an impeller within a set of audio frequencies that excludes predetermined audio frequencies. For example, the set of audio frequencies may exclude any frequencies that correspond to harmonic frequencies. In some embodiments, the plurality of algorithms can identify spacing of the blades that results in distributing sound from the impeller based on the audio spread-spectrum while minimizing a distance between a center of mass of the impeller and the center hub of the impeller. The plurality of algorithms are described in greater detail below in relation to FIG. 4.

At block 306, an impeller design generator 146 can generate the impeller design based on the plurality of algorithms, wherein the impeller design comprises an arrangement of the plurality of blades with a center of mass below a threshold, and wherein the angular spacing of the blades and a blade pass frequency (BPF) results in sound within the range of audio frequencies. A blade pass frequency, as referred to herein, corresponds to a rate at which blades pass by a fixed position within the impeller. The blade pass frequency can be determined by multiplying a number of blades times a rotational speed of the impeller and dividing the result by sixty. In some embodiments, the blade pass frequency of an impeller can be used as input in the algorithms to determine the angular spacing of the blades. In some examples, the output from a first algorithm can also be used as input for a second algorithm as described in greater detail below in relation to FIG. 4. In some embodiments, the plurality of algorithms can reduce a distance between a center of mass of an impeller and the center of a hub of the impeller, which thereby reduces mechanical stress on the impeller. The algorithms can reduce this distance while generating sound that is distributed throughout audio frequencies of the audio spread-spectrum.

At block 308, the impeller design generator 146 can transmit instructions based on the impeller design to a fabrication device. For example, the impeller design generator 146 can transmit instructions that enable a fabrication device to manufacture an impeller based on the impeller design using any suitable three dimensional printing technique, among others.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application.

Figure 4:
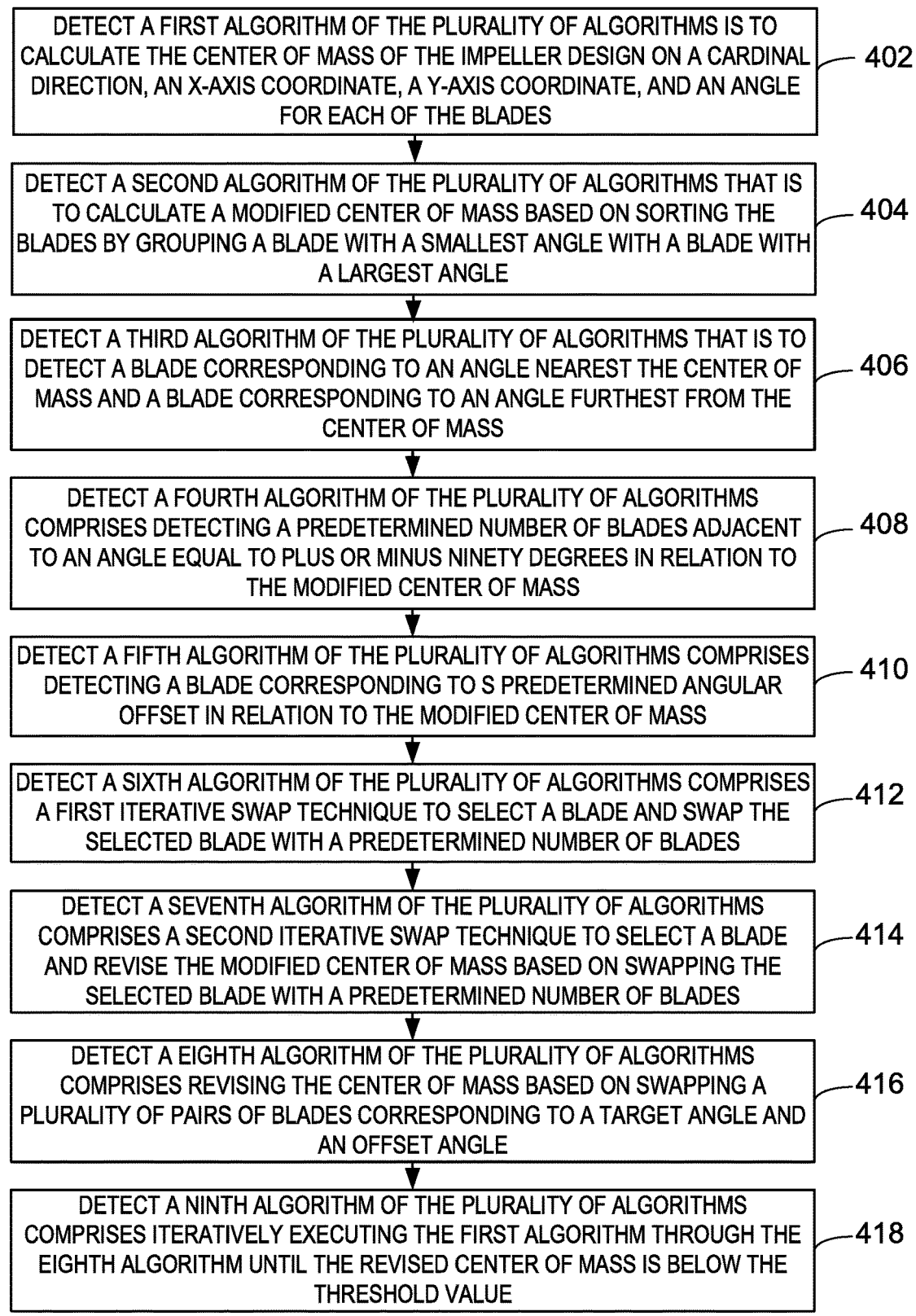
FIG. 4 is a process flow diagram of an example method for using a plurality of algorithms to generate the impeller design based on an audio spread-spectrum.

FIG. 4 is a process flow diagram of an example method for using a plurality of algorithms to generate the impeller design based on an audio spread-spectrum. The method 400 can be implemented with any suitable computing device, such as the computing system 102 of FIG. 1.

At block 402, an algorithm detector 144 can detect a first algorithm of the plurality of algorithms that is to calculate the center of mass of the impeller design based on a cardinal direction, an X-axis coordinate, a Y-axis coordinate, and an angle for each of the blades. In some embodiments, the cardinal directions associated with each blade can indicate a direction the blade is positioned around the center hub of an impeller in two dimensional space. For example, a ninety degree cardinal direction can correspond to a zero Y-axis value along the positive X-axis. In some examples, a one-hundred and eighty degree cardinal direction can correspond to a zero X-axis value along the Y-axis in a negative direction, a two-hundred and seventy degree cardinal direction can correspond to a zero Y-axis value along the negative X-axis, and a zero value cardinal direction can correspond to a zero X-axis value along the positive Y-axis. In some embodiments, each X-axis coordinate and Y-axis coordinate for a blade can correspond to a location where the blade attaches to the center hub. In some embodiments, each X-axis coordinate and Y-axis coordinate can alternatively correspond to a location where a blade attaches to an outer edge of an impeller. Each angle corresponding to each blade can indicate an angle proximate a blade. For example, the angle can indicate an angle between two adjacent blades. The algorithm detector 144 can populate a table with various values for each blade. For example, Table 1 below indicates the following angles, cardinal directions, X-axis coordinates, and Y-axis coordinates for an impeller with 23 blades and mechanical tolerance of twenty percent. In some embodiments, the impeller design can include any suitable number of blades and any suitable mechanical tolerance. In some examples, each impeller blade is simplified to be a moment arm of length 1 and mass 1 wholly at the end of the moment arm.

TABLE 1

| # | Angle | CardinalDirection | x | y |
|---|---|---|---|---|
| 1: | 12.684942046968 | 0 | 1 | 0 |
| 2: | 12.920896139618 | 12.684942046968 | 0.97559232928919 | 0.21958963325277 |
| 3: | 13.16123924198 | 25.605838186586 | 0.90178865723695 | 0.43217729889339 |
| 4: | 13.406052994537 | 38.767077428566 | 0.77969824521319 | 0.62615544907911 |
| 5: | 13.655420556378 | 52.173130423104 | 0.61327814690224 | 0.78986702332238 |
| 6: | 13.909426633442 | 65.828550979482 | 0.40946935104087 | 0.91232387371929 |
| 7: | 14.168157507294 | 79.737977612924 | 0.17815117975532 | 0.98400312862906 |
| 8: | 14.431701064433 | 93.906135120218 | −0.068120739196099 | 0.99767708447743 |
| 9: | 14.700146826143 | 108.33783618465 | −0.31461783973308 | 0.94921842318915 |
| 10: | 14.973585978907 | 123.03798301079 | −0.54519337343563 | 0.83831031579116 |
| 11: | 15.252111405377 | 138.0115689897 | −0.74327855804387 | 0.66898205144251 |
| 12: | 15.535817715924 | 153.26368039508 | −0.89308537054167 | 0.44988723134187 |
| 13: | 15.824801280781 | 168.799498111 | −0.98095297052252 | 0.19424538507529 |
| 14: | 16.119160262773 | 184.62429939178 | −0.99674499552784 | −0.08061894250241 |
| 15: | 16.418994650663 | 200.74345965455 | −0.93517669428106 | −0.35418152192562 |
| 16: | 16.724406293119 | 217.16245430522 | −0.79692787226883 | −0.60407447090659 |
| 17: | 17.035498933306 | 233.88686059834 | −0.58938442028069 | −0.80785271252277 |
| 18: | 17.352378244127 | 250.92235953164 | −0.32685260613923 | −0.94507532708245 |
| 19: | 17.67515186412 | 268.27473777577 | −0.030110909272341 | −0.99954656376919 |
| 20: | 18.003929434022 | 285.94988963989 | 0.27479248665984 | −0.96150355655884 |
| 21: | 18.338822634008 | 303.95381907391 | 0.558520793093 | −0.82949052055028 |
| 22: | 18.679945221628 | 322.29264170792 | 0.7911420841768 | −0.61163240810505 |
| 23: | 19.027413070452 | 340.97258692955 | 0.94536106103156 | −0.32602525099336 |
| Center of Mass: | 1.5563100073454 | 7.74895117739 | 0.20734798515611 | 1.5424356232968 |

The algorithm detector 144 can populate the initial angles of Table 1 based on Equations 1 and 2 below. In Equations 1 and 2, B is equal to the number of blades to be included in an impeller design, T is equal to mechanical tolerance of the impeller design, and n is equal to a particular blade in the impeller design.

$$\text{scalar}[n] = 2^{(n-1)} \left( \frac{\log_2 \frac{1+T}{1-T}}{B-1} \right) \qquad \text{Eq. 1}$$

$$\alpha[n] = \text{scalar}[n] \left( \frac{360}{\sum_{1}^{B} \text{scalar}[n]} \right) \qquad \text{Eq. 2}$$

The center of mass of the impeller design can be determined by using Equations 3 and 4 below, wherein n is equal to a number of blades in an impeller design and z is equal to a particular blade. Equations 3 and 4 sum up the X coordinates and the Y coordinates for the impeller blades with a moment arm length value of one at a position of the end of each blade or moment arm.

$$x[n] = \cos(\Sigma_{z=1}^{z=n} \alpha[z]) \qquad \text{Eq. 3}$$

$$y[n] = \sin(\Sigma_{z=1}^{z=n} \alpha[z]) \qquad \text{Eq. 4}$$

At block 404, the algorithm detector 144 can detect a second algorithm of the plurality of algorithms that is to calculate a modified center of mass based on sorting the blades by grouping a blade with a smallest angle with a blade with a largest angle, removing the grouped blades, and grouping additional blades in response to detecting ungrouped blades. For example, the algorithm detector 144 can group blades 1 and 23, followed by blades 2 and 22, etc. The grouping of the blades is illustrated below in Table 2.

The smallest angle, as referred to herein, includes the first blade adjacent to a reference angle. For example, a reference angle may reside along the zero value of the X-axis in a positive Y-axis direction. A blade adjacent to the reference angle in a clockwise direction may be considered the smallest angle. By contrast, the largest angle may correspond to the blade adjacent the reference angle in the counter-clockwise direction. In some embodiments, the algorithm detector 144 can use the blade adjacent to the reference angle in the counter-clockwise direction as the smallest angle and the blade adjacent to the reference angle in the clockwise direction can be the largest angle. The algorithm detector 144 can calculate the modified center of mass using any suitable mathematical technique or equation such as Equations 3 and 4 above. In some examples, the algorithm detector 144 can calculate the modified center of mass using the second algorithm repeatedly in an iterative or recursive technique to reduce the center of mass closer to a zero value. As discussed above, a zero value for the center of mass indicates that the blades of an impeller rotate with a minimal amount of mechanical stress or wobble. In some embodiments, Table 2 can include the angle corresponding to each blade from Table 1 above. For example, Table 2 can include an angle of 12.68 corresponding to blade 1, an angle of 19.03 corresponding to blade 23, and the like. The value 278.76 in Table 2 indicates an angle associated with the revised center of mass.

TABLE 2

| Order | 1 | 23 | 2 | 22 | 3 | 21 | 4 | 20 | 5 | 19 | 6 | 18 | 7 | 17 | 8 | 16 | 9 | 15 | 10 | 14 | 11 | 13 | 12 |
|---|---|---|---|---|---|---|---|---|---|---|---|---|---|---|---|---|---|---|---|---|---|---|---|
| COM | .11618 | 278.76 | | | | | | | | | | | | | | | | | | | | | |

At block 406, the algorithm detector 144 can detect a third algorithm of the plurality of algorithms that is to detect a blade corresponding to an angle nearest the center of mass and a blade corresponding to an angle furthest from the center of mass. In some embodiments, the angle nearest the center of mass is detected by summing each of the blades or moment arms and calculating a corresponding x-y position. The angle can be calculated by translating the x-y position into polar coordinates. The algorithm can select a lowest number based on the center of mass angle and the absolute value of the center of mass angle through a blade N angle. The third algorithm can also revise the modified center of mass based on swapping the blade corresponding to the angle nearest the center of mass and the blade corresponding to the angle furthest from the center of mass with the blade with the smallest angle and the blade with the largest angle. As illustrated in Table 3 below, blades 1 and 4 are swapped in one example.

TABLE 3

| Order | 4 | 23 | 2 | 22 | 3 | 21 | 1 | 20 | 5 | 19 | 6 | 18 | 7 | 17 | 8 | 16 | 9 | 15 | 10 | 14 | 11 | 13 | 12 |
|---|---|---|---|---|---|---|---|---|---|---|---|---|---|---|---|---|---|---|---|---|---|---|---|
| COM | .05172 | | | | | | | | | | | | | | | | | | | | | | |

At block 408, the algorithm detector 144 can detect a fourth algorithm of the plurality of algorithms comprises detecting a predetermined number of blades adjacent to an angle equal to plus or minus ninety degrees in relation to the modified center of mass. The fourth algorithm can also include identifying a plurality of blade permutations based on swapping the predetermined number of blades. Additionally, the fourth algorithm can include revising the modified center of mass based on a blade permutation with a lowest center of mass value. In the example illustrated in Table 4 below, blades 4, 23, 12, 20, 19, 9, 16 are rearranged to lower the center of mass closer to zero.

TABLE 4

| Order | 23 | 12 | 2 | 22 | 3 | 21 | 1 | 19 | 5 | 20 | 6 | 18 | 7 | 17 | 8 | 9 | 16 | 15 | 10 | 14 | 11 | 13 | 4 |
|---|---|---|---|---|---|---|---|---|---|---|---|---|---|---|---|---|---|---|---|---|---|---|---|
| COM | .01605 | | | | | | | | | | | | | | | | | | | | | | |

At block 410, the algorithm detector 144 can detect a fifth algorithm of the plurality of algorithms comprises detecting a blade corresponding to a predetermined angular offset in relation to the modified center of mass. The fifth algorithm can also include revising the modified center of mass based on swapping the blade corresponding to the predetermined angular offset with a predetermined number of blades corresponding to angles with an absolute value difference that is below a threshold value. In the example illustrated below in Table 5, blades 10 and 9 are swapped.

TABLE 5

| Order | 23 | 12 | 2 | 22 | 3 | 21 | 1 | 19 | 5 | 20 | 6 | 18 | 7 | 17 | 8 | 10 | 16 | 15 | 9 | 14 | 11 | 13 | 4 |
|---|---|---|---|---|---|---|---|---|---|---|---|---|---|---|---|---|---|---|---|---|---|---|---|
| COM | .00477 | | | | | | | | | | | | | | | | | | | | | | |

At block 412, the algorithm detector 144 can detect a sixth algorithm of the plurality of algorithms comprises a first iterative swap technique to select a blade and swap the selected blade with a predetermined number of blades corresponding to angles with an absolute value difference that is below a threshold value. The sixth algorithm can also revise the modified center of mass in response to repeating the first iterative swap technique for each of the blades. In the example illustrated in Table 6 below, blades 13, 14, and 11 are swapped to reduce the center of mass.

TABLE 6

| Order | 23 | 12 | 2 | 22 | 3 | 21 | 1 | 19 | 5 | 20 | 6 | 18 | 7 | 17 | 8 | 10 | 16 | 15 | 9 | 13 | 14 | 11 | 4 |
|---|---|---|---|---|---|---|---|---|---|---|---|---|---|---|---|---|---|---|---|---|---|---|---|
| COM | .00073 | | | | | | | | | | | | | | | | | | | | | | |

At block 414, the algorithm detector 144 can detect a seventh algorithm of the plurality of algorithms comprises a second iterative swap technique to select a blade and revise the modified center of mass based on swapping the selected blade with a predetermined number of blades corresponding to angles with an absolute value difference that is below a threshold value. The seventh algorithm can also repeat the second iterative swap technique for each of the blades. In the example illustrated below in Table 7, several of the blades are swapped to further reduce the center of mass.

TABLE 7

| Order | 22 | 11 | 1 | 23 | 3 | 21 | 5 | 18 | 6 | 19 | 2 | 17 | 8 | 20 | 10 | 7 | 15 | 16 | 9 | 13 | 14 | 12 | 4 |
|---|---|---|---|---|---|---|---|---|---|---|---|---|---|---|---|---|---|---|---|---|---|---|---|
| COM | .00028 | | | | | | | | | | | | | | | | | | | | | | |

At block 416, the algorithm detector 144 can detect an eighth algorithm of the plurality of algorithms comprises revising the center of mass based on swapping a plurality of pairs of blades corresponding to a target angle and an offset angle. For example, the eighth algorithm can swap or rotate the blades so that blade 2 is adjacent to the center of mass and blade 19 corresponds to an opposing angle to blade 2. This example is illustrated below in relation to Table 8.

TABLE 8

| Order | 2 | 17 | 8 | 20 | 10 | 7 | 15 | 16 | 9 | 13 | 14 | 12 | 4 | 22 | 11 | 1 | 23 | 3 | 21 | 5 | 18 | 6 | 19 |
|---|---|---|---|---|---|---|---|---|---|---|---|---|---|---|---|---|---|---|---|---|---|---|---|
| COM | .000244 | | | | | | | | | | | | | | | | | | | | | | |

At block 418, the algorithm detector 144 can detect a ninth algorithm of the plurality of algorithms comprises iteratively executing the first algorithm, the second algorithm, the third algorithm, the fourth algorithm, the fifth algorithm, the sixth algorithm, the seventh algorithm, and the eighth algorithm until the revised center of mass is below the threshold value. For example, the ninth algorithm can swap or rotate the blades so that blade 17 is adjacent to the center of mass and blade 2 corresponds to an opposing angle to blade 17. This example is illustrated below in relation to Table 9. In some embodiments, the ninth algorithm can be executed until the center of mass of the impeller design is below a threshold value.

TABLE 9

| Order | 17 | 8 | 20 | 10 | 7 | 15 | 16 | 9 | 13 | 14 | 12 | 4 | 22 | 11 | 1 | 23 | 3 | 21 | 5 | 18 | 6 | 19 | 2 |
|---|---|---|---|---|---|---|---|---|---|---|---|---|---|---|---|---|---|---|---|---|---|---|---|
| COM | .000243 | | | | | | | | | | | | | | | | | | | | | | |

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application. In some examples, the blades can be arranged based on a clockwise or counter clockwise direction. Additionally, the algorithm detector 144 can stop revising the center of mass in response to the revised center of mass being below a threshold value. For example, the algorithm detector 144 may not execute algorithms three through nine or any other suitable algorithms if algorithms one and two result in a center of mass below a threshold value. In some examples, algorithms two through nine can be executed in any suitable order to that the output of algorithm three may be used as input for algorithm six, among other examples.

Figure 5:
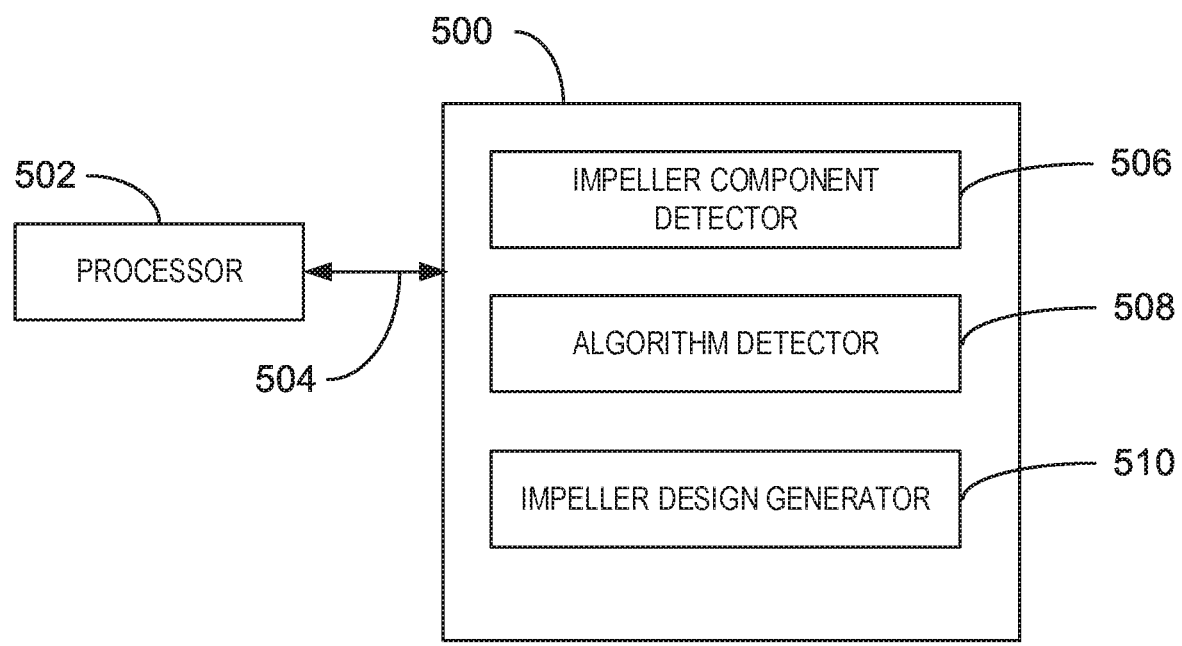
FIG. 5 is a block diagram of an example computer-readable storage media that can generate an impeller design based on an audio spread-spectrum.

FIG. 5 is a block diagram of an example computer-readable storage media that can generate an impeller design based on an audio spread-spectrum. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include an impeller component detector 506 can detect a number of blades to be included in an impeller design and a mechanical tolerance of the blades. In some examples, an algorithm detector 508 can detect a plurality of algorithms corresponding to the impeller design, wherein the plurality of algorithms identify an angular spacing of the blades that results in an audio spread-spectrum within a range of audio frequencies. In some embodiments, an impeller component detector 510 can generate the impeller design based on the plurality of algorithms, wherein the impeller design comprises an arrangement of the plurality of blades with a center of mass below a threshold, and wherein the angular spacing of the blades and a blade pass frequency (BPF) results in sound that is distributed in the range of audio frequencies.

It is to be understood that any number of additional software components not shown in FIG. 5 may be included within the tangible, computer-readable storage media 500, depending on the specific application.

FIG. 6 is a process flow diagram of an example method for operating a fan. In some embodiments, the process 600 can be implemented with any suitable fan, such as the impeller 200 of FIG. 2.

At block 602, the process 600 can include driving a fan with a motor. In some examples, the fan can have an impeller with a plurality of blades, wherein the blades are angularly spaced around a hub to provide an audio spread-spectrum within a range of audio frequencies. In some embodiments, an arrangement of the blades has a center of mass below a threshold, and the angular spacing of the blades and a blade pass frequency (BPF) results in sound that is distributed in the range of audio frequencies. In some examples, the arrangement of the blades can be determined using any suitable algorithms, such as the algorithms of FIG. 4 discussed above.

In one embodiment, the process flow diagram of FIG. 6 is intended to indicate that the steps of the method 600 are to be executed in a particular order. Alternatively, in other embodiments, the steps of the method 600 can be executed in any suitable order and any suitable number of the steps of the method 600 can be included. Further, any number of additional steps may be included within the method 600, depending on the specific application.

Example 1

In an embodiment, a fan for cooling an electronic device can include an enclosure, a motor secured within the enclosure, and an impeller to be turned by the motor. In some examples, the impeller has a plurality of blades, wherein an angular spacing of the blades is identified using a plurality of algorithms and a mechanical tolerance of the blades that results in an audio spread-spectrum within a range of audio frequencies. In some examples, an arrangement of the blades has a center of mass below a threshold, and the angular spacing of the blades and a blade pass frequency (BPF) results in sound that is distributed in the range of audio frequencies.

Alternatively, or in addition, the arrangement of the blades is determined by calculating the center of mass of the impeller based on a cardinal direction, an X-axis coordinate, a Y-axis coordinate, and an angle for each of the blades. Alternatively, or in addition, the arrangement of the blades is determined by calculating a modified center of mass based on sorting the blades by grouping a blade with a smallest angle with a blade with a largest angle; removing the grouped blades; and grouping additional blades in response to detecting ungrouped blades. Alternatively, or in addition, the arrangement of the blades is determined by detecting a blade corresponding to an angle nearest the center of mass and a blade corresponding to an angle furthest from the center of mass; and revising the modified center of mass based on swapping the blade corresponding to the angle nearest the center of mass and the blade corresponding to the angle furthest from the center of mass with the blade with the smallest angle and the blade with the largest angle. Alternatively, or in addition, the arrangement of blades is determined by detecting a predetermined number of blades adjacent to an angle equal to plus or minus ninety degrees in relation to the modified center of mass; identifying a plurality of blade permutations based on swapping the predetermined number of blades; and revising the modified center of mass based on a blade permutation with a lowest center of mass value. Alternatively, or in addition, the arrangement of blades is determined by detecting a blade corresponding to a predetermined angular offset in relation to the modified center of mass; and revising the modified center of mass based on swapping the blade corresponding to the predetermined angular offset with a predetermined number of blades corresponding to angles with an absolute value difference that is below a threshold value. Alternatively, or in addition, the arrangement of blades is determined using a first iterative swap technique to select a blade and swap the selected blade with a predetermined number of blades corresponding to angles with an absolute value difference that is below a threshold value; and to revise the modified center of mass in response to repeating the first iterative swap technique for each of the blades. Alternatively, or in addition, the arrangement of the blades is determined using a second iterative swap technique to select a blade and revise the modified center of mass based on swapping the selected blade with a predetermined number of blades corresponding to angles with an absolute value difference that is below a threshold value; and to repeat the second iterative swap technique for each of the blades; and to revise the center of mass based on swapping a plurality of pairs of blades corresponding to a target angle and an offset angle.

Example 2

Another embodiment described herein includes a method of operating a fan that includes driving a fan with a motor, the fan having an impeller with a plurality of blades. In some examples, the blades are angularly spaced around a hub to provide an audio spread-spectrum within a range of audio frequencies, wherein an arrangement of the blades has a center of mass below a threshold, and wherein the angular spacing of the blades and a blade pass frequency (BPF) results in sound that is distributed in the range of audio frequencies.

Alternatively, or in addition, the arrangement of the blades is determined by calculating the center of mass of the impeller based on a cardinal direction, an X-axis coordinate, a Y-axis coordinate, and an angle for each of the blades. Alternatively, or in addition, the arrangement of the blades is determined by calculating a modified center of mass based on sorting the blades by grouping a blade with a smallest angle with a blade with a largest angle; removing the grouped blades; and grouping additional blades in response to detecting ungrouped blades. Alternatively, or in addition, the arrangement of the blades is determined by detecting a blade corresponding to an angle nearest the center of mass and a blade corresponding to an angle furthest from the center of mass; and revising the modified center of mass based on swapping the blade corresponding to the angle nearest the center of mass and the blade corresponding to the angle furthest from the center of mass with the blade with the smallest angle and the blade with the largest angle. Alternatively, or in addition, the arrangement of blades is determined by detecting a predetermined number of blades adjacent to an angle equal to plus or minus ninety degrees in relation to the modified center of mass; identifying a plurality of blade permutations based on swapping the predetermined number of blades; and revising the modified center of mass based on a blade permutation with a lowest center of mass value. Alternatively, or in addition, the arrangement of blades is determined by detecting a blade corresponding to a predetermined angular offset in relation to the modified center of mass; and revising the modified center of mass based on swapping the blade corresponding to the predetermined angular offset with a predetermined number of blades corresponding to angles with an absolute value difference that is below a threshold value. Alternatively, or in addition, the arrangement of blades is determined using a first iterative swap technique to select a blade and swap the selected blade with a predetermined number of blades corresponding to angles with an absolute value difference that is below a threshold value; and to revise the modified center of mass in response to repeating the first iterative swap technique for each of the blades. Alternatively, or in addition, the arrangement of the blades is determined using a second iterative swap technique to select a blade and revise the modified center of mass based on swapping the selected blade with a predetermined number of blades corresponding to angles with an absolute value difference that is below a threshold value; and to repeat the second iterative swap technique for each of the blades; and to revise the center of mass based on swapping a plurality of pairs of blades corresponding to a target angle and an offset angle.

Example 3

In one example, a method for designing impellers can include detecting a number of blades to be included in an impeller design and a mechanical tolerance of the blades. The method can also include detecting a plurality of algorithms corresponding to the impeller design, wherein the plurality of algorithms identify an angular spacing of the blades that results in an audio spread-spectrum within a range of audio frequencies. Additionally, the method can include generating the impeller design based on the plurality of algorithms, wherein the impeller design comprises an arrangement of the plurality of blades with a center of mass below a threshold, and wherein the angular spacing of the blades and a blade pass frequency (BPF) results in sound that is distributed in the range of audio frequencies. Furthermore, the method can include transmitting instructions to a fabrication device to manufacture an impeller based on the impeller design.

Alternatively, or in addition, the method can include transmitting instructions to a fabrication device to manufacture an impeller based on the impeller design. Alternatively, or in addition, a first algorithm of the plurality of algorithms can include calculating the center of mass of the impeller design based on a cardinal direction, an X-axis coordinate, a Y-axis coordinate, and an angle for each of the blades. Alternatively, or in addition, a second algorithm of the plurality of algorithms can include calculating a modified center of mass based on sorting the blades by grouping a blade with a smallest angle with a blade with a largest angle; removing the grouped blades; and grouping additional blades in response to detecting ungrouped blades. Alternatively, or in addition, a third algorithm of the plurality of algorithms can include detecting a blade corresponding to an angle nearest the center of mass and a blade corresponding to an angle furthest from the center of mass; and revising the modified center of mass based on swapping the blade corresponding to the angle nearest the center of mass and the blade corresponding to the angle furthest from the center of mass with the blade with the smallest angle and the blade with the largest angle.

Alternatively, or in addition, a fourth algorithm of the plurality of algorithms can include detecting a predetermined number of blades adjacent to an angle equal to plus or minus ninety degrees in relation to the modified center of mass; identifying a plurality of blade permutations based on swapping the predetermined number of blades; and revising the modified center of mass based on a blade permutation with a lowest center of mass value. Alternatively, or in addition, a fifth algorithm of the plurality of algorithms can include detecting a blade corresponding to a predetermined angular offset in relation to the modified center of mass; and revising the modified center of mass based on swapping the blade corresponding to the predetermined angular offset with a predetermined number of blades corresponding to angles with an absolute value difference that is below a threshold value. Alternatively, or in addition, a sixth algorithm of the plurality of algorithms can include a first iterative swap technique to select a blade and swap the selected blade with a predetermined number of blades corresponding to angles with an absolute value difference that is below a threshold value; and revise the modified center of mass in response to repeating the first iterative swap technique for each of the blades. Alternatively, or in addition, a seventh algorithm of the plurality of algorithms can include a second iterative swap technique to select a blade and revise the modified center of mass based on swapping the selected blade with a predetermined number of blades corresponding to angles with an absolute value difference that is below a threshold value; and repeat the second iterative swap technique for each of the blades. Alternatively, or in addition, an eighth algorithm of the plurality of algorithms can include revising the center of mass based on swapping a plurality of pairs of blades corresponding to a target angle and an offset angle. Alternatively, or in addition, a ninth algorithm of the plurality of algorithms comprises iteratively executing the first algorithm, the second algorithm, the third algorithm, the fourth algorithm, the fifth algorithm, the sixth algorithm, the seventh algorithm, and the eighth algorithm until the revised center of mass is below the threshold value.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A fan for cooling an electronic device, the fan comprising:
   an enclosure;
   a motor secured within the enclosure; and
   an impeller to be turned by the motor, the impeller having a plurality of blades in an arrangement so that a blade with a smallest angle is adjacent to a blade with a largest angle, wherein an angular spacing of the blades results in an audio spread-spectrum within a range of audio frequencies, and wherein the angular spacing of the blades and a blade pass frequency (BPF) results in sound that is distributed in the range of audio frequencies.

2. The fan recited in claim 1, wherein the arrangement of the blades is determined by calculating the center of mass of the impeller based on a cardinal direction, an X-axis coordinate, a Y-axis coordinate, and an angle for each of the blades.

3. The fan recited in claim 2, wherein the arrangement of the blades is determined by calculating a modified center of mass based on sorting the blades by grouping a blade with a smallest angle with a blade with a largest angle; removing the grouped blades; and grouping additional blades in response to detecting ungrouped blades.

4. The fan recited in claim 3, wherein the arrangement of the blades is determined by detecting a blade corresponding to an angle nearest the center of mass and a blade corresponding to an angle furthest from the center of mass; and revising the modified center of mass based on swapping the blade corresponding to the angle nearest the center of mass and the blade corresponding to the angle furthest from the center of mass with the blade with the smallest angle and the blade with the largest angle.

5. The fan recited in claim 3, wherein the arrangement of blades is determined by detecting a predetermined number of blades adjacent to an angle equal to plus or minus ninety degrees in relation to the modified center of mass; identifying a plurality of blade permutations based on swapping the predetermined number of blades; and revising the modified center of mass based on a blade permutation with a lowest center of mass value.

6. The fan recited in claim 3, wherein the arrangement of blades is determined by detecting a blade corresponding to a predetermined angular offset in relation to the modified center of mass; and revising the modified center of mass based on swapping the blade corresponding to the predetermined angular offset with a predetermined number of blades corresponding to angles with an absolute value difference that is below a threshold value.

7. The fan recited in claim 3, wherein the arrangement of blades is determined using a first iterative swap technique to select a blade and swap the selected blade with a predetermined number of blades corresponding to angles with an absolute value difference that is below a threshold value; and to revise the modified center of mass in response to repeating the first iterative swap technique for each of the blades.

8. The fan recited in claim 7, wherein the arrangement of the blades is determined using a second iterative swap technique to select a blade and revise the modified center of mass based on swapping the selected blade with a predetermined number of blades corresponding to angles with an absolute value difference that is below a threshold value; and to repeat the second iterative swap technique for each of the blades; and to revise the center of mass based on swapping a plurality of pairs of blades corresponding to a target angle and an offset angle.

9. A method of operating a fan, comprising:
 driving a fan with a motor, the fan having an impeller with a plurality of blades in an arrangement so that a blade with a smallest angle is adjacent to a blade with a largest angle, the blades being angularly spaced around a hub to provide an audio spread-spectrum within a range of audio frequencies, and wherein the angular spacing of the blades and a blade pass frequency (BPF) results in sound that is distributed in the range of audio frequencies.

10. The method of claim 9, wherein the arrangement of the blades is determined by calculating the center of mass of the impeller based on a cardinal direction, an X-axis coordinate, a Y-axis coordinate, and an angle for each of the blades.

11. The method of claim 10, wherein the arrangement of the blades is determined by calculating a modified center of mass based on sorting the blades by grouping a blade with a smallest angle with a blade with a largest angle; removing the grouped blades; and grouping additional blades in response to detecting ungrouped blades.

12. The method of claim 11, wherein the arrangement of the blades is determined by detecting a blade corresponding to an angle nearest the center of mass and a blade corresponding to an angle furthest from the center of mass; and revising the modified center of mass based on swapping the blade corresponding to the angle nearest the center of mass and the blade corresponding to the angle furthest from the center of mass with the blade with the smallest angle and the blade with the largest angle.

13. The method of claim 12, wherein the arrangement of blades is determined by detecting a predetermined number of blades adjacent to an angle equal to plus or minus ninety degrees in relation to the modified center of mass; identifying a plurality of blade permutations based on swapping the predetermined number of blades; and revising the modified center of mass based on a blade permutation with a lowest center of mass value.

14. The method of claim 11, wherein the arrangement of blades is determined by detecting a blade corresponding to a predetermined angular offset in relation to the modified center of mass; and revising the modified center of mass based on swapping the blade corresponding to the predetermined angular offset with a predetermined number of blades corresponding to angles with an absolute value difference that is below a threshold value.

15. The method of claim 11, wherein the arrangement of blades is determined using a first iterative swap technique to select a blade and swap the selected blade with a predetermined number of blades corresponding to angles with an absolute value difference that is below a threshold value; and to revise the modified center of mass in response to repeating the first iterative swap technique for each of the blades.

16. The method of claim 11, wherein the arrangement of the blades is determined using a second iterative swap technique to select a blade and revise the modified center of mass based on swapping the selected blade with a predetermined number of blades corresponding to angles with an absolute value difference that is below a threshold value; and to repeat the second iterative swap technique for each of the blades; and to revise the center of mass based on swapping a plurality of pairs of blades corresponding to a target angle and an offset angle.

17. A method for designing impellers, comprising:
 detecting a number of blades to be included in an impeller design and a mechanical tolerance of the blades;
 detecting a plurality of algorithms corresponding to the impeller design, wherein the plurality of algorithms identify an angular spacing of the blades that results in an audio spread-spectrum within a range of audio frequencies;
 generating the impeller design based on the plurality of algorithms, wherein the impeller design comprises an arrangement of the plurality of blades in an arrangement so that a blade with a smallest angle is adjacent to a blade with a largest angle, and wherein the angular spacing of the blades and a blade pass frequency (BPF) results in sound that is distributed in the range of audio frequencies; and
 transmitting instructions to a fabrication device to manufacture an impeller based on the impeller design.

18. The method of claim 17, wherein a first algorithm of the plurality of algorithms comprises calculating the center of mass of the impeller design based on a cardinal direction, an X-axis coordinate, a Y-axis coordinate, and an angle for each of the blades.

19. The method of claim 18, wherein a second algorithm of the plurality of algorithms comprises calculating a modified center of mass based on sorting the blades by grouping a blade with a smallest angle with a blade with a largest angle; removing the grouped blades; and grouping additional blades in response to detecting ungrouped blades.

20. The method of claim 19, wherein a third algorithm of the plurality of algorithms comprises detecting a blade corresponding to an angle nearest the center of mass and a blade corresponding to an angle furthest from the center of mass; and revising the modified center of mass based on swapping the blade corresponding to the angle nearest the center of mass and the blade corresponding to the angle furthest from the center of mass with the blade with the smallest angle and the blade with the largest angle.

* * * * *